H. C. REID.
TRACTOR.
APPLICATION FILED JUNE 1, 1920.

1,422,375.

Patented July 11, 1922.
4 SHEETS—SHEET 1.

WITNESS
H. C. Sherburne.

INVENTOR
Henry C. Reid.
BY
White Frost & Evans
his ATTORNEYS

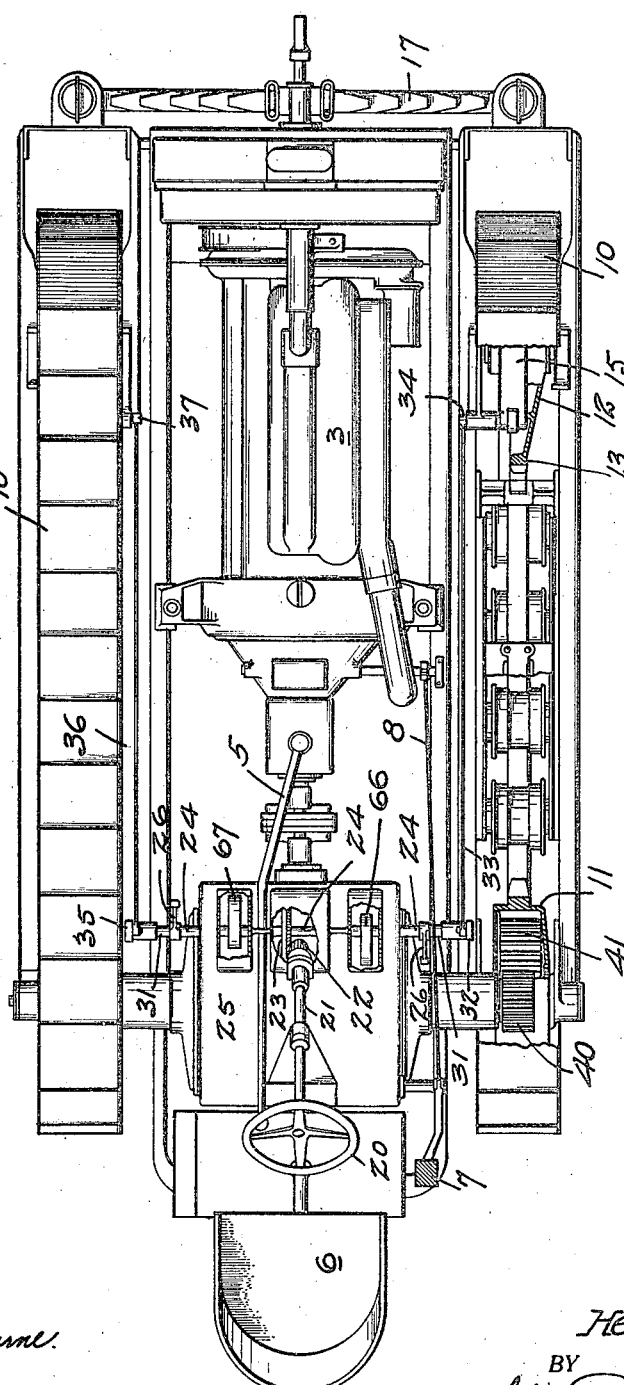

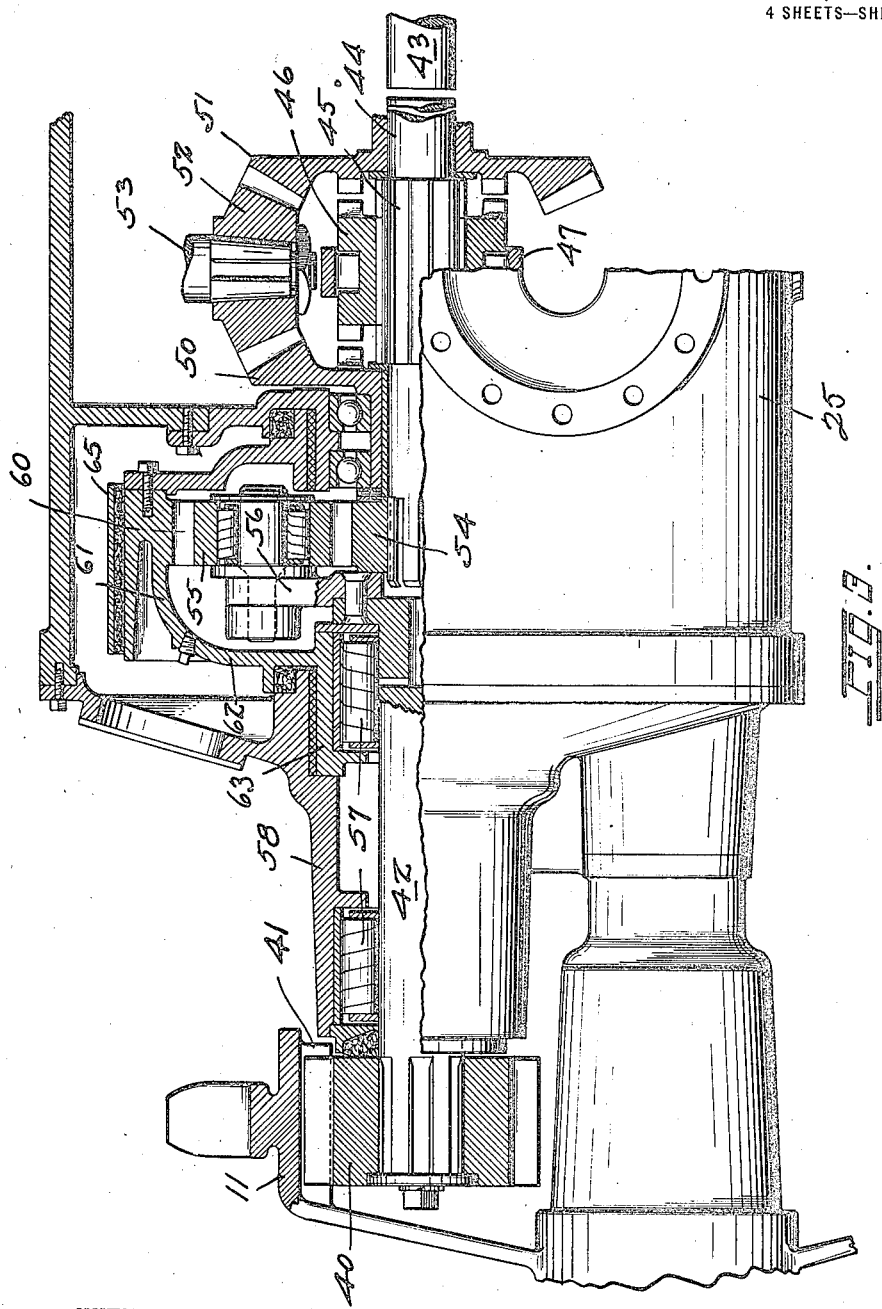

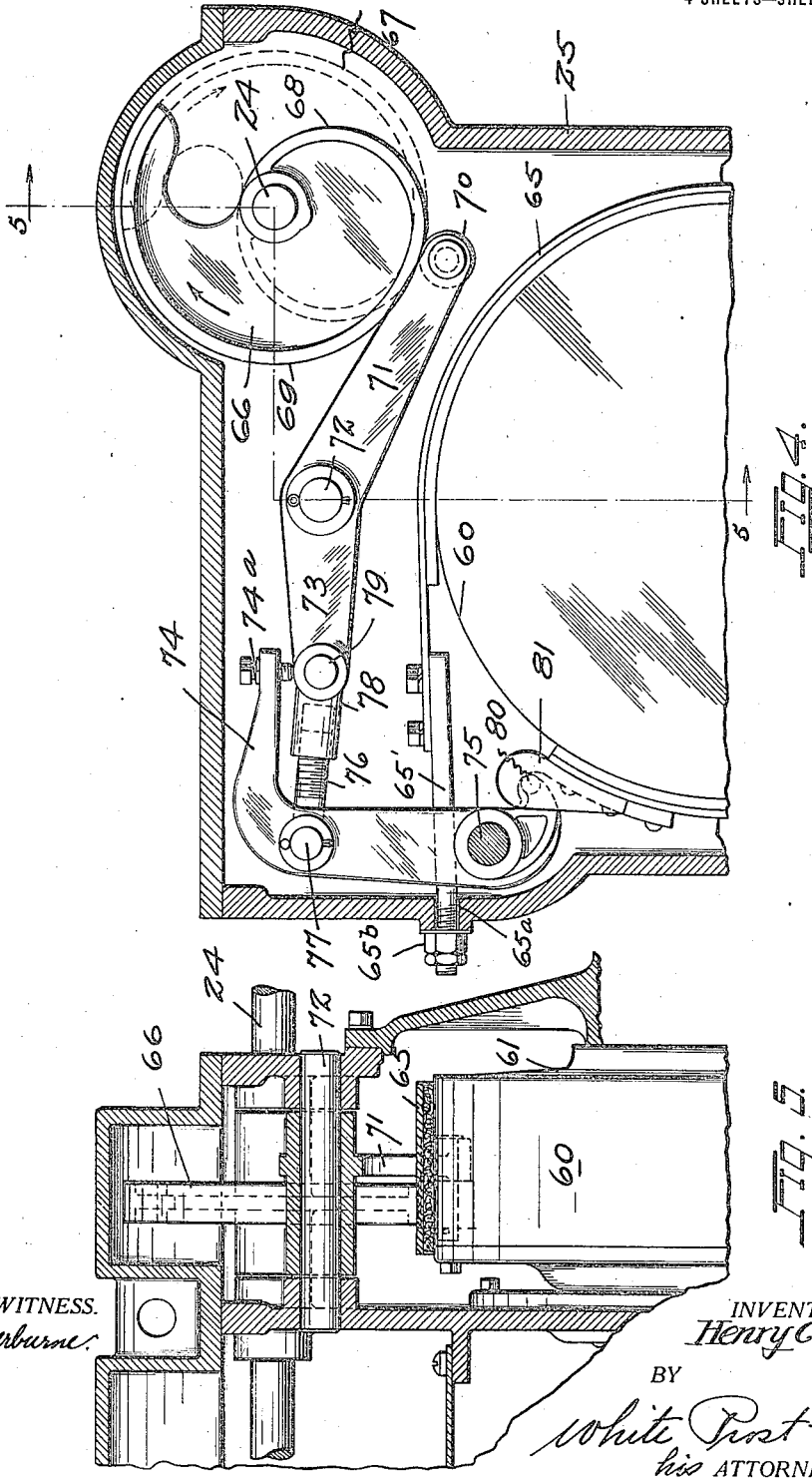

UNITED STATES PATENT OFFICE.

HENRY CLAY REID, OF SAN FRANCISCO, CALIFORNIA, ASSIGNOR TO PACIFIC FIRE EXTINGUISHER COMPANY, OF SAN FRANCISCO, CALIFORNIA, A CORPORATION OF CALIFORNIA.

TRACTOR.

1,422,375.  Specification of Letters Patent.  Patented July 11, 1922.

Application filed June 1, 1920. Serial No. 385,513.

*To all whom it may concern:*

Be it known that I, HENRY C. REID, a citizen of the United States, and a resident of the city and county of San Francisco and State of California, have invented certain new and useful Improvements in Tractors, of which the following is a specification.

This invention relates to vehicles and more particularly to tractors of the endless traction belt class.

It is one of the objects of the present invention to provide an improved transmission mechanism for endless belt tractors.

It is a further object of the present invention to provide a transmission mechanism whereby the ready reverse or forward propulsion of the vehicle can be secured, and, in this connection it is a further object of the invention to provide a reverse gear of simple design and construction.

A further object of the invention is to provide an improved transmission mechanism including a reversible drive shaft section and driven sections with means for connecting the driven sections to the drive section and further to provide for the concurrent or uniform drive of each of the sections or a selective connection of the several sections of the shaft.

Another object of the invention is to provide for the facile direction of drive or steering of the vehicle and to provide for the application of power to one of the endless traction belts while the other belt may idle or may be locked against rotation.

A further object of the present invention is to provide a self contained means for controlling the application of the power concurrently to the drive wheels of the traction belts and to secure the selective coupling of the drive means to either of the belts, in the latter case, to secure concurrently the release of the driving means of one of the belts and the application of the driving means of another belt.

Another object of the invention is to provide a simple and improved clutch brake applying mechanism.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and descriptions as variations may be adopted within the scope of the invention as set forth in the claim.

Referring to the drawings:

Fig. 2 is a plan view of the vehicle, certain of its parts broken away and shown in section.

Fig. 3 is a plan view partly in section showing in detail the improved transmission and drive axle of the vehicle.

Fig. 4 is a vertical sectional detail view of the clutch brake and its applying mechanism.

Fig. 5 is a vertical sectional view approximately on line 5—5 of Fig. 4 showing the clutch brake mechanism.

Figure 1:
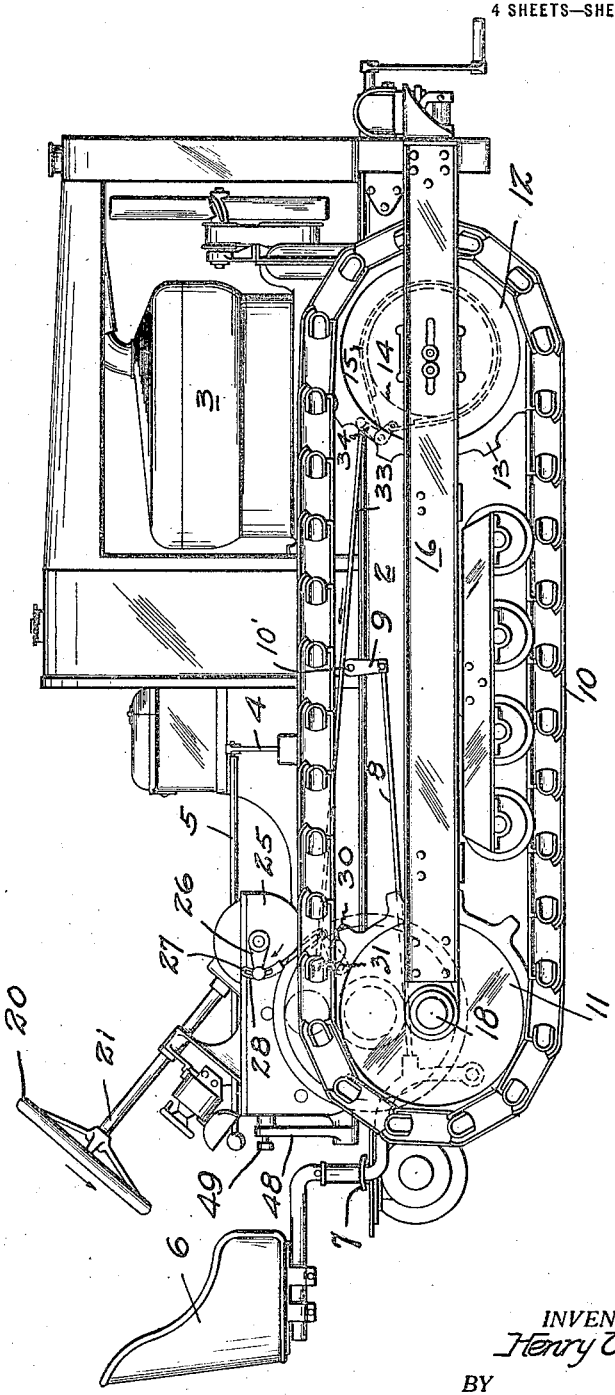
Fig. 1 is a longitudinal elevation of the improved tractor, certain parts being broken away to illustrate certain details of construction.

The invention is embodied as here illustrated in a form of tractor having a suitable main frame 2 carrying a power plant 3 including an engine and a change gear mechanism the latter being provided with a gear shifter 4 that has an operating rod 5 extending rearwardly to a position convenient to the operator's seat 6. And from this seat there is also easily operable a clutch pedal 7 connected by a link 8 to the lever 9 on a clutch shifting shaft 10′. The above described mechanisms may be of any suitable type and construction and form no essential feature of the present invention other than to provide for the control of the power plant and speed with which the vehicle may be driven.

The frame 2 is supported on side traction belts 10 each of which has a rear driving sprocket 11 and a front wheel 12 preferably provided with sprocket teeth 13 and with a brake band flange 14; each flange being respectively provided with a suitable brake band 15. The front wheels 12 of the belt 10 are respectively journaled in side frames 16 to the front ends of which are attached a transverse spring 17 on which the front end of the main frame is supported while the rear ends of the side frames 16 are pivotally mounted on the axle 18 at the rear end of the frame and on which the driving wheels 11 are provided.

One of the features of the invention resides in provision for facilitating the turning of the vehicle to the right or left in an arc of very short radius and a preferred form of means for accomplishing this action includes devices controlled by a steering mechanism for automatically interrupting the application of power to the traction driving wheels 11 so that one or the other of the belts 10 will be held stationary while the other is driven, that belt which is not driven being locked against action by its respective brake.

It is also desirable that means be provided for the concurrent application of power to both of the driving wheels 11 and their belts 10 to secure a straight forward or reverse drive of the vehicle and also to secure the release of the brakes at one time so as to permit the free drive of the vehicle. In the present construction the steering wheel 20 is secured to a steering rod 21 and the latter is provided with a bevel or other suitable gear 22 engaging with a complementary gear 23 secured on a transversely extending rock shaft 24 which passes through and is supported in a gear box 25 shown as arranged adjacent the rear end of the main frame with the steering wheel 20 disposed convenient to the operator occupying the seat 6. On the outer ends of the rock shaft 24 are secured lever arms 26 that are set in opposite direction and these lever arms engage respective lost motion links 27 having their upper ends provided with arcuate slots 28 in which pins on the outer ends of the levers 26 operate. In a neutral position of the steering wheel 20 the lever pins stand in the slots 28 intermediate their ends so that the levers may have a predetermined free movement before becoming effective to engage and actuate the respective links 27.

Each link 27 is connected at its lower end to a lever arm 30, one for each link, said lever arm being provided on a rock shaft 31, one of which is provided on each side of the gear box 25. The rock shaft 31 on the right hand side of the machine is provided with a lever arm 32 having a connecting link 33 extending forwardly and being connected to a lever 34 operatively connected to the brake band 15 of the right hand wheel 12 to set or to release the same according to the direction of turning of the steering wheel 20. The rock shaft 31 on the left hand side of the machine is provided with a lever 35 connected by a link 36 to a brake lever 37 attached to the brake band of the front left hand wheel 15. When it is desired to steer the tractor in a right hand turn the steering wheel 20 is rotated in a corresponding direction, this will result in the rotation of the rock shaft 24 as indicated by the arrow thereon, in Fig. 1, with the result that the lever 26 is turned upwardly and after a predetermined degree of movement engages the upper end of the link 27 and this then acts through the lever arm 30, the link 33 and the brake arm 34 to apply the right hand brake to its wheel. While the lever arm 26 on the left hand side of the machine may be moving in a similar arc during the application of the right hand brake it does not function to set the brake on the left hand wheel but to leave the same free. It will be seen therefore that the purpose of the slotted links 27 is to provide for a preliminary movement of the respective lever arms 26 in either direction before there is a positive connection between the lever arms and their respective links with the result that the brakes are both normally free of their respective brake bands and wheels.

The steering wheel 20 is used not only for the purpose of applying one or the other of the brake means to the respective traction belts but also serves the further function of causing the disconnection of the power transmitting means from that traction belt which is locked by the application of its brake without, however, interrupting the driving of the opposite belt.

To facilitate this control of the application of the power to the driving belts a form of transmission mechanism is utilized comprising independently operative and selectable transmission gears each of which includes a pinion wheel or gear 40, Fig. 3, this gear engaging with the internally toothed surface 41, provided to mesh therewith on the flange of the sprocket or driving wheels 11.

The left and right hand driving pinions 40 are securely keyed on respective shafts 42 and 43 spaced in axial alinement and alining with an intermediate section or driving shaft portion 44 having a central part 45 keyed or splined to a reversing clutch 46 engaged and shiftable by a yoke 47. The shifting yoke 47 may be manually operated at will as by means of a shift lever 48 mounted on the rear end of the gear box 25 in a position convenient to the driver and the reverse lever 48 may be temporarily locked in the neutral or in the forward or reverse driving position as by a detent or pin 49. The reverse clutch 46 has its end faces provided to selectively engage with reverse gears 50—51 mounted loosely upon the driving shaft section 44 and the reverse gears 50—51 are constantly interengaged with a driving pinion 52 secured on the contiguous end of a propeller shaft 53 operatively connected to the power plant including the engine and the change gear set above referred to.

It is obvious that when the reverse clutch 46 is locked in the intermediate position the intermediate shaft section 44 is not driven but when the clutch 46 is shifted into engagement with the gears 50—51 selectively then power is transmitted from the engaged gear to the intermediate shaft section 44 and from this is preferably transmitted to the coordinate outer shaft section 42 or 43 as the case may be by means of a planetary transmission system so that the transmission of power to the shafts 42 and 43 can be interrupted at will independently of the shifting of the reverse gear clutch 46.

Such a planetary transmission may include a sun gear 54 on each end of the shaft section 44 this sun gear engaging with one or more planetary gears 55 provided on a rotating carrier or spider 56 formed or provided on the inner end of the respective shafts 42 and 43 which are shown as operating in anti-friction bearings 57 arranged in sleeves 58 extending from the gear box. Since the planetary gear mechanisms above described are substantially duplicate only the one pair that is relative to the shaft 42 is here illustrated. The gears 55 in each planetary set are constantly intermeshed with an internal gear 60 forming a portion of an overhanging flange 61 having a web 62 and a hub 63, the latter bearing on the adjacent set of anti-friction bearings 57 and also in the inner end of the journaled sleeve 58. As is well known if the internal gear 60 is permitted to freely revolve with the running planetary gears then there is no power transmitted to the attached shaft 42 and to secure the transmission of power from the driving shaft 44 it is necessary to hold the internal gear 60 against rotation with the result that the carrier or spider 56 and its attached shaft 42 will be rotated as the pinions 55 roll around the relatively stationary gear 60.

In the nomal condition of driving the tractor straight ahead or straight in the reverse the respective internal gears 60 of the shafts 42 and 43 are held against rotation by brake bands 65 and these are normally left in the effective position to secure the equal application of the power of the motor to the shafts 42 and 43 as soon as the engine clutch is thrown and when the reverse clutch 46 is set as may be desired to drive ahead or in reverse.

As above stated it is desirable to interrupt the application of power to the inside traction belt 10 upon taking a turn and yet to leave the outside traction belt in gear with the driving mechanism, and this action is secured through the medium of the steering means including the wheel 20 as will now be described with reference particularly to Figs. 4 and 5 for illustration. On the rock shaft 24 there is secured a pair of reversely disposed cams 66—67 one of which is set left hand and the other right hand. Each of these cams has a volute portion 68 and a concentric portion 69 tangent to the extremity or outer portion of the part 68. The cams 66—67 are disposed with the extremities of their volute portions 68 substantially in a common radial plane to the axis of the shaft 24 and each of the cams engages a respective cam roller 70 on the adjacent end of a lever 71 mounted on a fulcrum 72 and having a short arm 73 disposed in the plane of movement of a toggle lever 74, in the form of a bell crank pivoted on fulcrum 75. Pivoted on a pin 77 in the lever 74 is a threaded rod 76 engaging a socket link 78 pivoted on a pin 79 in the adjacent arm 73. The arm 73 and the connected parts 76—78 form a toggle link mechanism which acts, when the lever arm 71 is depressed to thrust the crank lever 74 outwardly about its pivot 75 and rock a hook 80 upwardly against an abutment 81 provided on the adjacent end of the brake band 65 applied to the flange of the internal gear 60. A stop screw 74a is provided in the swinging end of arm 74.

When, in the operation of the tractor, it is desired to make a right hand turn the driver throws the steering wheel so as to rock the rock shaft 24 in the direction of the arrow on the cam 66 which brings the volute portion 68 of the cam towards the cam roller 70 and thus releases the tension on the brake or clutch band 65 while at the same time the cam 67 moving with the shaft 24 maintains its concentric portion or face against its respective clutch lever arm 71 without releasing the tension of its respective brake or clutch band 65. As the cams 66—67 move from the position shown in Fig. 4 in the direction of the arrow thereon the brake levers 26 on the rock shaft 24 have a preliminary lost motion with respect to the links 27 so that the clutch band 65 of the inside belt transmission mechanism, in making a turn, is released from the drum of the respective internal gear 60 before the brake band 15 of the inside turning wheel 12 becomes applied. Continued rotation of the steering shaft 24 thus applies the brake 15 on the inside turning traction belt wheel 12 and the wheel with its belt becomes locked against rotation while the opposite traction belt forms the sole driving means thus effectively swinging the vehicle in an arc of short radius as about the stationary and fixed or locked traction belt. The reverse operation of the steering wheel 20 with the rock shaft 24 is followed when it is desired to make a turn in the left hand direction. It will thus be seen that one or the other of the planetary clutch bands 65 is always applied and that when the steering mechanism is in the intermediate or neutral position then both of the planetary clutch bands are applied.

It is desirable to secure a facile adjustment of the planetary brake band 65 and this adjustment is provided for and can be readily secured through means of an extension or stem 65' passing from one end of the brake band 65 through an aperture 65ᵃ in the gear box or casing. The outer end of the stem 65' is shown as threaded and carrying a pair of lock nuts 65ᵇ which can be tightened up from the exterior of the gear box to take up wear and play of the brake band 65.

In the present disclosure only the front wheels of the tractor are provided with brake mechanism.

What is claimed is:

A tractor having side, traction belts and idler sprockets therefor; means for driving the belts, brakes for the belts and operative on said sprockets, and a device for steering the tractor comprising means for holding the driving means concurrently applied to each belt and releasing the brakes at that time, or for setting the brake and releasing the drive of one belt and conversely acting on the other, said means having reversely acting connections to the drive means.

In testimony whereof, I have hereunto set my hand.

HENRY CLAY REID.